US00RE47620E

(19) United States
(12) Reissued Patent
Viavant et al.

(10) Patent Number: US RE47,620 E
(45) Date of Reissued Patent: Sep. 24, 2019

(54) METHOD AND APPARATUS FOR ENSURING AN ALLOWABLE CLIENT CONFIGURATION FOR AN APPLICATION

(71) Applicant: Oracle International Corporation, Redwood Shores, CA (US)

(72) Inventors: Steven Viavant, Piedmont, CA (US); Bruce Eimon, Hillsborough, CA (US); Leslie Gloyd, Littleton, MA (US); Joe McDonald, Acton, MA (US); Jeffrey Lynn McReynolds, Highland Village, TX (US); Lane Thomas Findley, Albuquerque, NM (US)

(73) Assignee: Oracle International Corporation, Redwood Shores, CA (US)

(21) Appl. No.: 15/834,808

(22) Filed: Dec. 7, 2017

Related U.S. Patent Documents

Reissue of:
(64) Patent No.: 7,257,623
Issued: Aug. 14, 2007
Appl. No.: 10/447,426
Filed: May 28, 2003

(51) Int. Cl.

| | |
|---|---|
| ***G06F 15/16*** | (2006.01) |
| ***G06F 9/445*** | (2018.01) |
| ***H04L 29/08*** | (2006.01) |
| ***H04L 29/06*** | (2006.01) |

(52) U.S. Cl.
CPC ..... *G06F 9/44505* (2013.01); *G06F 9/44526* (2013.01); *H04L 29/06* (2013.01); *H04L 67/34* (2013.01); *H04L 69/329* (2013.01)

(58) Field of Classification Search
CPC ..... H04L 29/06; H04L 67/34; H04L 69/329; G06F 8/00; G06F 8/60; G06F 8/61; G06F 8/64; G06F 8/65; G06F 8/70; G06F 8/71; G06F 8/658
USPC ..... 709/203, 220; 717/168, 170, 171, 172, 717/173, 174, 176, 177, 178
See application file for complete search history.

(56) References Cited

U.S. PATENT DOCUMENTS 6,006,034 A * 12/1999 Heath ..... G06F 8/65 717/170
6,151,643 A * 11/2000 Cheng ..... G06F 8/62 709/200
6,327,617 B1 * 12/2001 Fawcett ..... G06F 8/65 709/219

(Continued)

FOREIGN PATENT DOCUMENTS

GB 2311389 * 9/1997
GB 2311389 A 9/1997

*Primary Examiner* — William H. Wood
(74) *Attorney, Agent, or Firm* — Kilpatrick Townsend Stockton LLP

(57) ABSTRACT

One embodiment of the present invention provides a system that ensures an allowable client configuration for an application. During operation, the client sends a request to access the application to a server hosting the application. In response the request, the server downloads an analysis application to the client. Next, the client executes the analysis application, whereby the analysis application gathers configuration data that specifies a present configuration of the client. The system examines this configuration data to determine whether the client has a configuration that allows the application to execute on the client based on pre-established criteria. If the client has an allowable configuration, the system allows the client to execute the application.

21 Claims, 6 Drawing Sheets

(56) References Cited

U.S. PATENT DOCUMENTS

| | | | | |
|---|---|---|---|---|
| 6,691,113 | B1 * | 2/2004 | Harrison | G06F 17/30887 |
| 6,918,113 | B2 * | 7/2005 | Patel et al. | 717/178 |
| 7,016,864 | B1 * | 3/2006 | Notz | G06Q 30/02 705/26.5 |
| 7,024,471 | B2 * | 4/2006 | George et al. | 709/222 |
| 2002/0002704 | A1 * | 1/2002 | Davis | G06F 8/60 717/170 |
| 2003/0037177 | A1 * | 2/2003 | Sutton | H04L 41/024 719/316 |
| 2003/0131226 | A1 * | 7/2003 | Spencer et al. | 713/100 |
| 2003/0200132 | A1 * | 10/2003 | Bryant | G06Q 30/02 705/7.29 |

* cited by examiner

BROWSER SCREEN 404

THE FOLLOWING CONDITIONS ARE NOTED

YOUR BROWSER CACHE DISK SPACE IS MARGINAL FOR THIS APPLICATION

YOUR CURRENT VERSION OF JINIT IS 1.1--VERSION 1.8 OR HIGHER IS REQUIRED FOR THIS APPLICATION

CLICKING HERE WILL UPDATE YOUR SYSTEM

FIG. 4B

BROWSER SCREEN 406

PLEASE WAIT WHILE YOUR SYSTEM IS UPDATED

PROGRESS 0 50 100

FIG. 4C

BROWSER SCREEN 408

WELCOME TO ACME CORPORATION

MANUFACTURING

SELECT FROM THE FOLLOWING:

MATERIAL INVENTORY

OPEN WORK ORDERS

WORK IN PROGRESS

FINISHED GOODS INVENTORY

FIG. 4D

METHOD AND APPARATUS FOR ENSURING AN ALLOWABLE CLIENT CONFIGURATION FOR AN APPLICATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

1. Field of the Invention

The present invention relates to the process of gathering configuration data for computer systems. More specifically, the present invention relates to a method and an apparatus for gathering configuration data for a client computer system prior to running an application on the client computer system.

2. Related Art

Computer networks presently allow applications to be migrated to servers, where they can be easily accessed by client computer systems across corporate intranets or the Internet. Effective administration of applications in this context requires detailed information about the hardware and software configuration of the client population using these applications. Many of these applications require a minimum client hardware configuration (CPU speed, memory, and swap space), operating system (type and version), browser software (type, version, loaded plug-ins and versions, and JAVA initiator version), network characteristics (bandwidth and latency), and other client configuration data, such as browser proxy and security settings. Failure to meet the minimum configuration requirements can cause substandard performance of the application or render the application inoperable.

Users need to be aware of system deficiencies and need to be able to redress these deficiencies. Additionally, system administrators require configuration data for the client systems under their control for a number of purposes, such as: analyzing the cost-effectiveness of upgrades; understanding the impact of fielding new applications with more stringent requirements than the existing client base can meet; and tuning existing applications to be less demanding of client resources. It is important to obtain this information in the context of the particular application(s) that the clients are using, since different application may have different demands on client resources. It is also important that the gathering of such data be as unobtrusive as possible, since application users may be reluctant to, or incapable of, successfully assisting administrators in obtaining this data.

Historically, the need to ensure an allowable configuration for a client computer system has been (partially) met by: (1) manual methods (visiting each client computer and manually recording the configuration of each client computer); (2) agent-based solutions that operate by installing an agent on each client computer system to gather and report configuration to a central repository; or (3) by providing documentation stating a required configuration for an application and leaving it as an exercise for the end-user to verify that a particular client has the required configuration.

While each of these techniques provide some advantages, they also have drawbacks: (1) manual methods are time consuming and prone to error; (2) the task of installing and updating an agent on each computer system is time-consuming; and (3) requiring a user to identify and change the configuration of a computer system can cause great difficulty for users who lack the technical expertise.

Hence, what is needed is a method and an apparatus for ensuring an allowable client configuration for an application without the problems stated above.

SUMMARY

One embodiment of the present invention provides a system that ensures an allowable client configuration for an application. During operation, the client sends a request to access the application to a server hosting the application. In response the request, the server downloads an analysis application to the client. Next, the client executes the analysis application, whereby the analysis application gathers configuration data that specifies a present configuration of the client. The system examines this configuration data to determine whether the client has a configuration that allows the application to execute on the client based on pre-established criteria. If the client has an allowable configuration, the system allows the client to execute the application.

In a variation of this embodiment, if the configuration data indicates the client does not have an allowable configuration, the system determines if the configuration of the client can be changed so that the client has the allowable configuration. If so, the system changes the configuration of the client.

In a further variation, the system asks a user to approve a change in configuration of the client prior to changing the configuration of the client.

In a further variation, if the present configuration indicates that the client has a marginal configuration based on a pre-established criterion, the system informs the user of the client that the client has a marginal configuration and allows the client to execute the application.

In a further variation, the system saves a token at the client indicating whether the client has an allowable configuration. During subsequent requests to execute the application, the system refers to the token to determine whether the client has an allowable configuration.

In a further variation, the token is set to expire after a predetermined time period has elapsed.

In a further variation, the system returns the present configuration to the server and allows the server to store the present configuration in a database, which includes configuration data for multiple clients.

In a further variation, the system analyzes the database to determine whether it is advantageous to upgrade the configuration of the clients.

BRIEF DESCRIPTION OF THE FIGURES

FIG. 4B illustrates a browser screen in accordance with another embodiment of the present invention.

FIG. 4C illustrates a browser screen in accordance with yet another embodiment of the present invention.

FIG. 4D illustrates a browser screen in accordance with a further embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Systems

Figure 1:
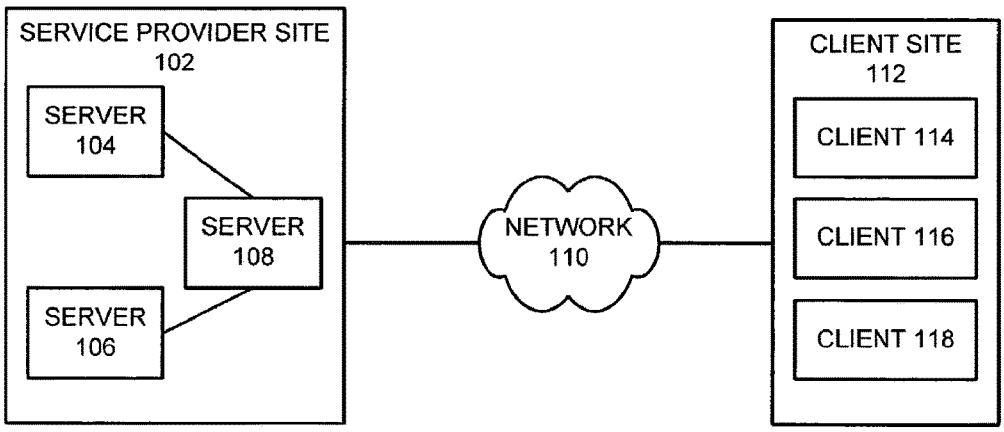
FIG. 1 illustrates computing systems in accordance with an embodiment of the present invention.

FIG. 1 illustrates a number of computing systems in accordance with an embodiment of the present invention. The system includes service provider site 102 and client site 112 coupled together by network 110. Network 110 can generally include any type of wire or wireless communication channel capable of coupling together computing nodes. This includes, but is not limited to, a local area network, a wide area network, or a combination of networks. In one embodiment of the present invention, network 110 includes the Internet.

Service provider site 102 includes servers 104, 106, and 108. Servers 104, 106, and 108 can generally include any nodes on a computer network including a mechanism for servicing requests from a client for computational and/or data storage resources. Note that service provider site 102 can include more or fewer servers than shown in FIG. 1.

Client site 112 includes clients 114, 116, and 118. Clients 114, 116, and 118 can generally include any node on a network including computational capability and including a mechanism for communicating across network 110. Note that client site 112 can include more or fewer clients than shown in FIG. 1.

During operation, users access applications on servers at service provider site 102 through clients at client site 112. For example, a user of client 116 can access an application on server 108 through a web browser executing on client 116.

Server

Figure 2:
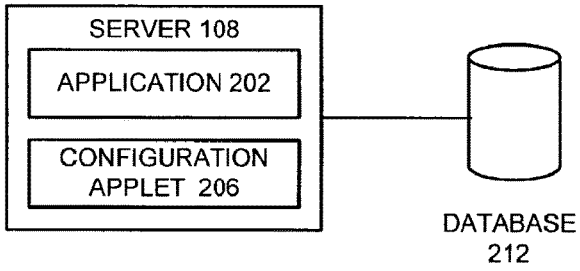
FIG. 2 illustrates a server in accordance with an embodiment of the present invention.

FIG. 2 illustrates a representative server 108 in accordance with an embodiment of the present invention. Server 108 includes application 202 and configuration applet 206.

Application 202 is representative of a number of applications that can be accessed on server 108. During operation, a user requests access to application 202 across network 110 from a client, say client 116, at client site 112. In response to this request, server 108 requests a configuration token from client 116. This token, which can be in the form of a cookie, provides server 108 with the current configuration of client 116. For example, the configuration data available within the token can include processor speed, memory size, available disk space, operating system and version, browser type and version, various registry and browser settings, and the like. The token can also include an expiration time. Note that in one embodiment of the invention, the data is sent one time and thereafter only a reference to the data is sent until the data has expired. If the token is available and current, server 108 examines the configuration data within the token to determine whether application 202 can execute on client 116. Note that this process is repeated independently for each combination of application and client.

If the token is not available or is not current, server 108 downloads configuration applet 206 to client 116. Configuration applet 206 examines hardware and software on client 116 and gathers specified configuration data from client 116. After gathering this configuration data, configuration applet 206 determines if client 116 meets pre-specified minimum requirements to execute application 202. If not, configuration applet 206 informs the user of client 116 whether the current configuration is marginal or unacceptable. Additionally, if configuration applet 206 is able to change the configuration of client 116, for example by downloading updated software, configuration applet 206 informs the user that the configuration can be updated. The user can then specify whether to update the configuration based upon the supplied data. Optionally, configuration applet 206 can update the configuration without asking the user. This option can be beneficial in a closed environment where an administrator retains control over all configurations.

After determining the configuration of client 116 and possibly upgrading the configuration, configuration applet 206 reports the configuration to server 108. Server 108 then determines whether to download application 202 to client 116. Server 108 also forms a token containing the configuration data, and possibly an expiration time, and returns it to client 116.

Server 108 also stores the configuration data in database 212. Database 212 can include any type of system for storing data in non-volatile storage. This includes, but is not limited to, systems based upon magnetic, optical, and magneto-optical storage devices, as well as storage devices based on flash memory and/or battery-backed up memory. Configuration data is saved in database 212 for each measured client.

Note that server 108 can also examine the data in database 212 to provide system administrators with information indicating which combinations of applications and clients are marginal or unavailable. This information can also be used to determine if upgrading hardware and/or software upgrades would be beneficial.

Client

Figure 3:
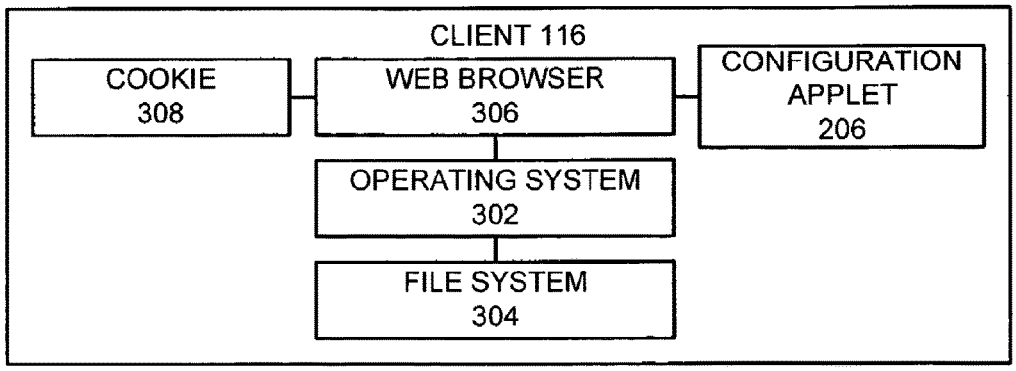
FIG. 3 illustrates a client in accordance with an embodiment of the present invention.

FIG. 3 illustrates client 116 in accordance with an embodiment of the present invention. Client 116 includes operating system 302, file system 304, web browser 306, and cookie 308. Operating system 302 controls the operation of client 116 and provides services to applications executing on client 116. File system 304 provides access to persistent storage on client 116 and is typically accessed from an application using service calls to operating system 302. Web browser 306 is an application, which executes on client 116 and which communicates across network 110 to access remote web servers that can provide applications such as application 202 on server 108. Cookie 308 is a token, which includes configuration data for client 116.

During operation, a user causes web browser 306 to send a request to access application 202. Prior to accessing application 202, client 116 receives and executes configuration applet 206, which determines whether the configuration of client 116 meets pre-defined criteria for application 202. Note that configuration applet can determine the configuration of client 116 from either cookie 308 or by examining the configuration of client 116. If not, the user is informed as to whether configuration applet 206 can upgrade the configuration of client 116, or whether the application will be allowed to run on a marginal configuration. If client 116 meets the pre-defined criteria, application 202 is allowed to execute on client 116.

Browser Screens

Figure 4A:
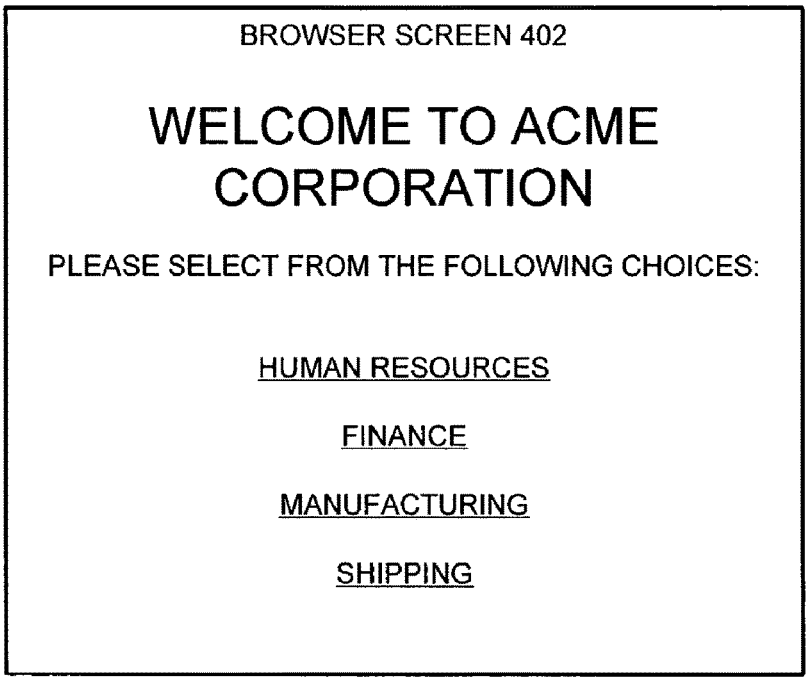
FIG. 4A illustrates a browser screen in accordance with an embodiment of the present invention.

FIG. 4A illustrates a browser screen 402 in accordance with an embodiment of the present invention. Browser screen 402 is illustrative of an opening, or welcome, screen used to access a set of applications related to an enterprise. Browser screen 402 includes several links, shown with underlines, that can be selected to access applications such as application 202 from a server 108 at service provider site 102.

After clicking on a link on browser screen 402, the server hosting the application, say server 108, attempts to retrieve the token from the client, say client 116, as described above. If client 116 has a current token for application 202 indicating that client 116 possesses an allowable configuration for executing application 202, application 202 is allowed to execute on client 116. On the other hand, if the token indicates a marginal or unacceptable configuration for application 202, the user is notified of the deficiencies.

If the token is not available or is not current, configuration applet 206 is downloaded to client 116 to collect configuration data as described above. After the configuration of client 116 has been examined and reported to server 108, configuration applet 206 presents browser screen 404 to the user (see FIG. 4B). Browser screen 404 presents information to the user concerning configuration deficiencies in client 116, which have been identified. These deficiencies can be color-coded. For example, marginal conditions can be coded in yellow and unsatisfactory conditions can be coded in red. If configuration applet 206 is able to update the configuration of client 116 to remedy the deficiencies, a link can be provided to allow the user to update the configuration. Note that if configuration applet 206 receives proper authorization from a system administrator, configuration applet 206 can update the configuration of client 116 without first obtaining acceptance of the update from the user.

While the configuration of client 116 is being updated, browser screen 406 is presented to the user (see FIG. 4C). Browser screen 406 includes a progress meter, which informs the user of the percent completion of the configuration updates. Optionally, browser screen 406 can include a time remaining counter. When the update is complete, application 202 is allowed to execute, and while executing, presents its first screen 408, illustrated in FIG. 4D. Browser screen 408 is representative of the opening screen of an application—in this instance, the manufacturing application. At this point, the user knows that the configuration of client 116 is adequate to execute the manufacturing application.

Determining Client Configuration

Figure 5:
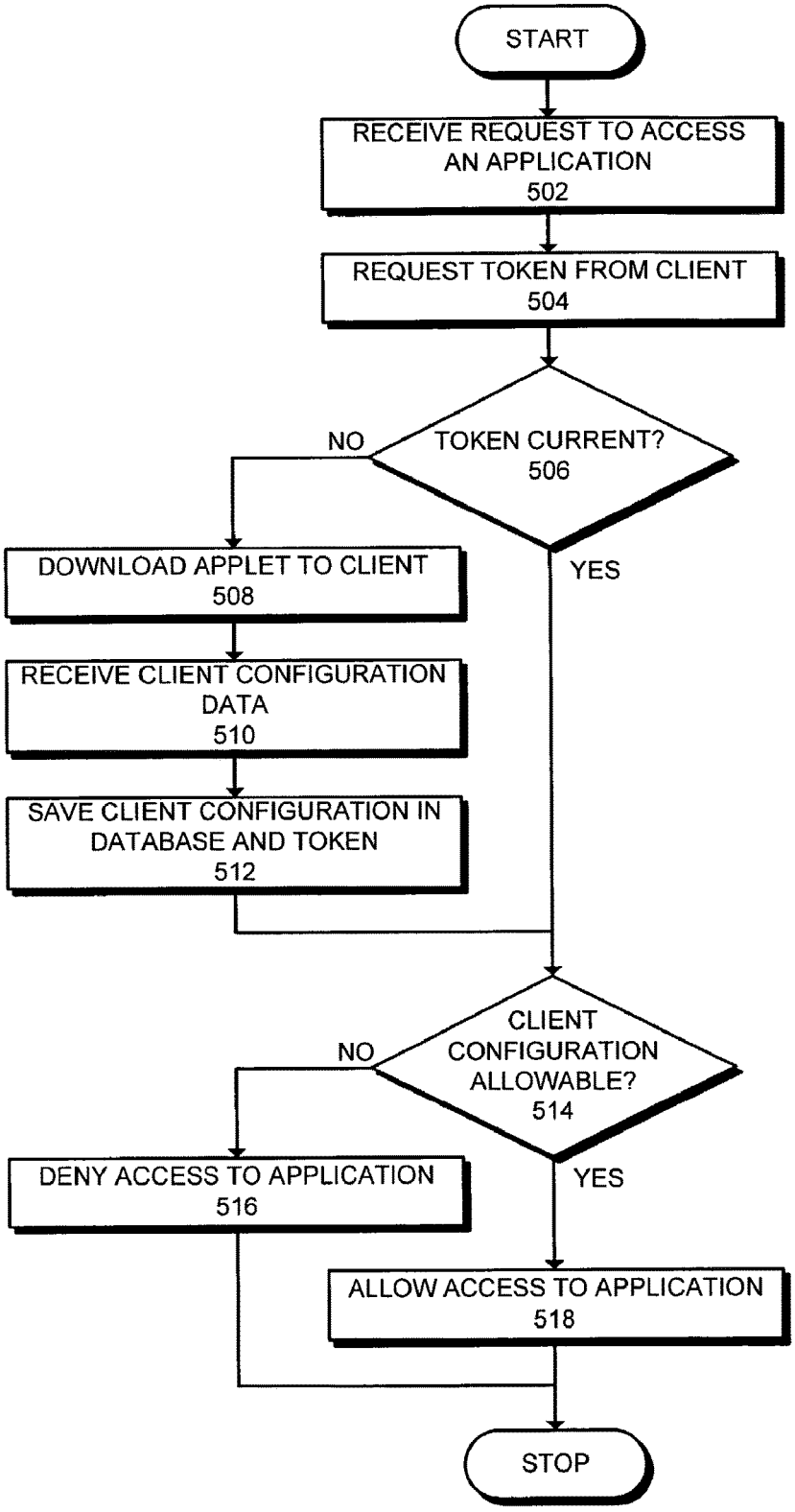
FIG. 5 is a flowchart illustrating the process of determining if the client configuration is allowable for a given application in accordance with an embodiment of the present invention.

FIG. 5 is a flowchart illustrating the process of determining if the client configuration is allowable for a given application in accordance with an embodiment of the present invention. The system starts when a server receives a request from a client to access an application (step 502). In response to this request, the system requests a configuration token from the client (step 504). Next, the system examines the token to determine if the token is current (step 506).

If the token is not current, or if the token does not exist, the system downloads a configuration applet to the client (step 508). Next, the system receives the client configuration data from the configuration applet (step 510). In response to receiving the configuration data, the system saves the configuration data in a database and provides the configuration data in a token stored in the client's persistent storage (step 512).

After receiving the configuration from either the token or from the configuration applet, the system determines if the client configuration allows the application to execute (step 514). If so, the client is allowed to access the application (step 518). Otherwise, the client is denied access to the application (step 516).

Determining Performance Improvements

Figure 6:
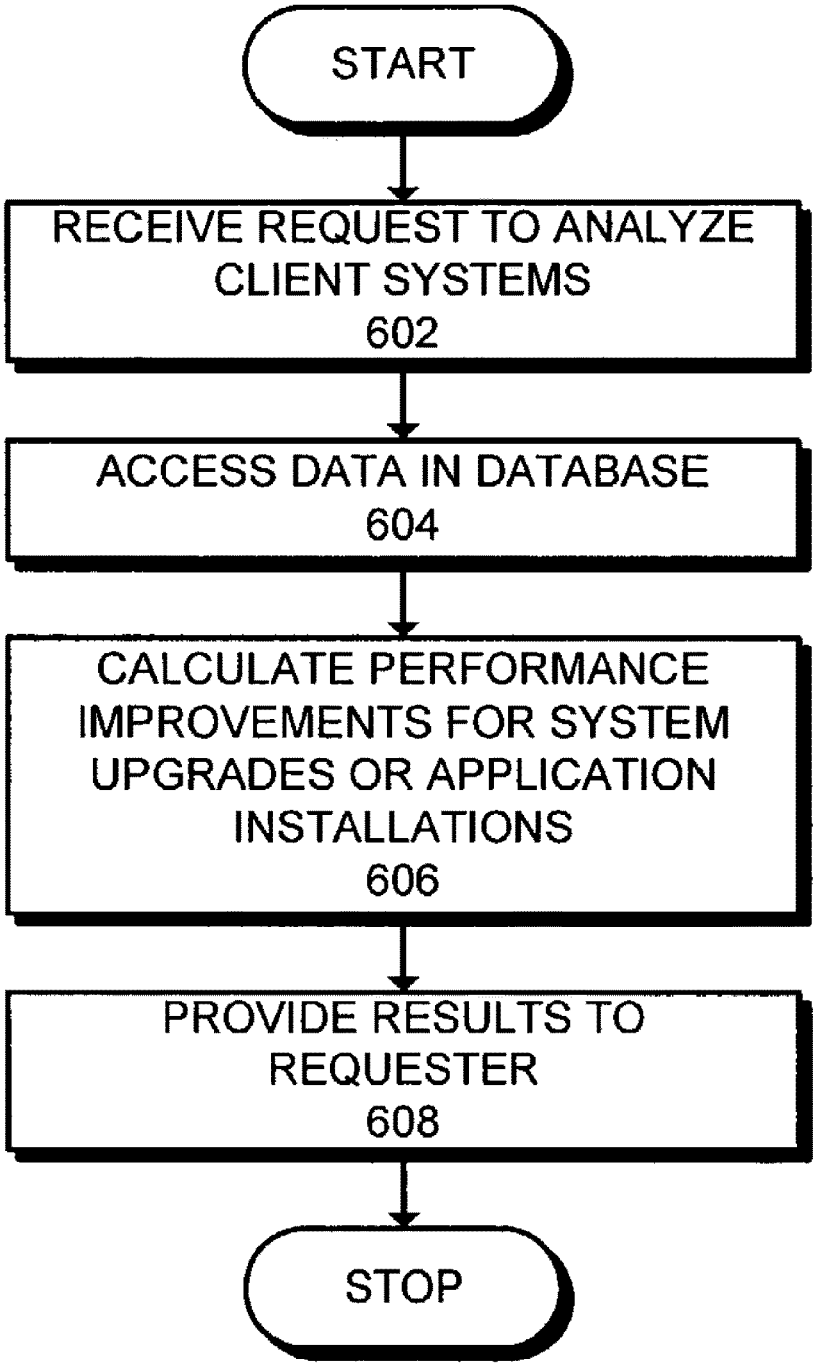
FIG. 6 is a flowchart illustrating the process of determining performance improvements for system upgrades in accordance with an embodiment of the present invention.

FIG. 6 is a flowchart illustrating the process of determining performance improvements for system upgrades in accordance with an embodiment of the present invention. The system starts when a request is received from an administrator to analyze client systems (step 602). In response to the request, the system accesses the configuration data in the database (step 604). Next, the system calculates the performance improvements for proposed system upgrades or proposed application installations (step 606). Finally, the system provides the results of the calculations to the administrator (step 608).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for ensuring an allowable client configuration for an application, comprising:

sending a request to a server from a client to access the application;

in response to the request, receiving an analysis application from the server at the client, *wherein the analysis application is distinct from the application*;

executing the analysis application on the client, wherein the analysis application gathers configuration data that specifies a present configuration of the client;

sending the configuration data to the server;

examining the present configuration at the server to determine whether the client has an allowable configuration that allows the application to execute on the client based on pre-established criteria;

if the present configuration indicates the client has the allowable configuration, allowing the client to execute the application; and if the present configuration indicates the client does not have an allowable configuration, determining if configuration settings at the client can be changed so that the client has an allowable configuration, and if so, changing configuration so that the client has an allowable configuration.

2. The method of claim 1, further comprising asking a user to approve a change in configuration prior to changing the configuration of the client.

3. The method of claim 1, wherein if the present configuration indicates that the client has a marginal configuration based on a pre-established criterion, the method further comprises:

informing a user of the client that the client has a marginal configuration; and allowing the client to execute the application.

4. The method of claim 1, further comprising:

saving a token at the client, wherein the token indicates whether the client has the allowable configuration for the application to execute; and during a subsequent request to execute the application, referring to the token to determine whether the client has an allowable configuration.

5. The method of claim 4, wherein the token is set to expire after a predetermined time period has elapsed.

6. The method of claim 1, further comprising:

returning the present configuration to the server; and allowing the server to store the present configuration in a database, wherein the database includes configuration data for a plurality of clients.

7. The method of claim 6, further comprising analyzing the database to determine whether it is advantageous to upgrade a configuration of the plurality of clients.

8. A computer-readable storage medium storing instructions that when executed by a computer cause the computer to perform a method for ensuring an allowable client configuration for an application, the method comprising:

sending a request to a server from a client to access the application;

in response to the request, receiving an analysis application from the server at the client, *wherein the analysis application is distinct from the application*;

executing the analysis application on the client, wherein the analysis application gathers configuration data that specifies a present configuration of the client;

sending the configuration data to the server;

examining the present configuration at the server to determine whether the client has an allowable configuration that allows the application to execute on the client based on pre-established criteria;

if the present configuration indicates the client has the allowable configuration, allowing the client to execute the application; and if the present configuration indicates the client does not have an allowable configuration, determining if configuration settings at the client can be changed so that the client has an allowable configuration, and if so, changing configuration so that the client has an allowable configuration.

9. The computer-readable storage medium of claim 8, the method further comprising asking a user to approve a change in configuration prior to changing the configuration of the client.

10. The computer-readable storage medium of claim 8, wherein if the present configuration indicates that the client has a marginal configuration based on a pre-established criterion, the method further comprises:

informing a user of the client that the client has a marginal configuration; and allowing the client to execute the application.

11. The computer-readable storage medium of claim 8, further comprising:

saving a token at the client, wherein the token indicates whether the client has the allowable configuration for the application to execute; and during a subsequent request to execute the application, referring to the token to determine whether the client has an allowable configuration.

12. The computer-readable storage medium of claim 11, wherein the token is set to expire after a predetermined time period has elapsed.

13. The computer-readable storage medium of claim 8, the method further comprising:

returning the present configuration to the server; and allowing the server to store the present configuration in a database, wherein the database includes configuration data for a plurality of clients.

14. The computer-readable storage medium of claim 13, the method further comprising analyzing the database to determine whether it is advantageous to upgrade a configuration of the plurality of clients.

15. An apparatus for ensuring an allowable client configuration for an application, comprising:

a sending mechanism configured to send a request to a server from a client to access the application;

a receiving mechanism configured to receive an analysis application from the server at the client in response to the request, *wherein the analysis application is distinct from the application*;

an executing mechanism configured to execute the analysis application on the client, wherein the analysis application gathers configuration data that specifies a present configuration of the client;

a sending mechanism configured to send the configuration data to the server;

an examining mechanism configured to examine the present configuration at the server to determine whether the client has an allowable configuration that allows the application to execute on the client based on pre-established criteria;

an application execution mechanism configured to allow the client to execute the application if the present configuration indicates the client has the allowable configuration, a determining mechanism configured to determine if configuration settings at the client can be changed so that the client has an allowable configuration; and a changing mechanism configured to change the configuration so that the client has an allowable configuration.

16. The apparatus of claim 15, further comprising a query mechanism configured to ask a user to approve a change in configuration prior to changing the configuration of the client.

17. The apparatus of claim 15, further comprising:

an informing mechanism configured to inform a user of the client that the client has a marginal configuration wherein if the present configuration indicates that the client has a marginal configuration based on a pre-established criterion; and wherein the allowing mechanism is further configured to allow the client to execute the application.

18. The apparatus of claim 15, further comprising:

a saving mechanism configured to save a token at the client, wherein the token indicates whether the client has the allowable configuration for the application to execute; and a referring mechanism configured to refer t to the token to determine whether the client has an allowable configuration during a subsequent request to execute the application.

19. The apparatus of claim 18, wherein the token is set to expire after a predetermined period has elapsed.

20. The apparatus of claim 15, further comprising:

a returning mechanism configured to return the present configuration to the server; and a storing mechanism configured to allow the server to store the present configuration in a database, wherein the database includes configuration data for a plurality of clients.

21. The apparatus of claim 20, further comprising an analyzing mechanism configured to analyze the database to determine whether it is advantageous to upgrade a configuration of the plurality of clients.

* * * * *